June 26, 1956 K. F. ROSS 2,752,484

HIGH-FREQUENCY SIGNALING SYSTEM

Filed Oct. 8, 1952 7 Sheets-Sheet 1

INVENTOR:

Karl F. Ross

June 26, 1956 K. F. ROSS 2,752,484

HIGH-FREQUENCY SIGNALING SYSTEM

Filed Oct. 8, 1952 7 Sheets-Sheet 2

INVENTOR:

Karl F. Ross

INVENTOR:
Karl F. Ross

INVENTOR:
Karl F. Ross

June 26, 1956 K. F. ROSS 2,752,484

HIGH-FREQUENCY SIGNALING SYSTEM

Filed Oct. 8, 1952 7 Sheets-Sheet 5

INVENTOR:

Karl F. Ross

HIGH-FREQUENCY SIGNALING SYSTEM

Filed Oct. 8, 1952

INVENTOR:
Karl F. Ross

HIGH-FREQUENCY SIGNALING SYSTEM

Filed Oct. 8, 1952

7 Sheets-Sheet 7

INVENTOR:

Karl F. Ross

United States Patent Office 2,752,484

Patented June 26, 1956

2,752,484

HIGH-FREQUENCY SIGNALING SYSTEM

Karl F. Ross, New York, N. Y.

Application October 8, 1952, Serial No. 313,630

21 Claims. (Cl. 250—13)

My present invention relates to telecommunication systems for the transmission of high-frequency signals, including television signals, over channels (radio, cable) of limited band width.

It has, up to now, virtually been an accepted fact that messages occupying a given frequency range can be transmitted only over a channel having a band spread at least substantially equal to said range. In the long-distance relaying of television programs, for example, recourse has been had to coaxial cables having a cutoff frequency in the megacycles, in order to enable the transmission of several million picture elements per second. Such cables are expensive, yet to-date the only alternative appeared to be the use of ultra-high-frequency carriers which, because of the known range limitations of short waves, required a network of closely spaced relay stations.

One of the objects of my invention is to provide means for reducing the band width requirements without material distortion of the message to be transmitted. I have found in accordance with the present invention that this object may be realized by distributing a message over a plurality of parallel channels, yet that further measures must be taken in order to convert this expansion of transmission facilities into a frequency gain on each channel. It is, accordingly, another object of my invention to provide means for transmitting a message originally occupying a given frequency range by dividing the message into a plurality of components and so modifying each component that it may be transmitted over an individual channel whose band width corresponds to but a fraction of said frequency range, this fraction being given, in an optimal case, by the quotient obtained by dividing the original range by the number of channels provided.

If the channels are metallic circuits, interference between them may be readily prevented by physical spacing and electrical insulation so that no frequency separation will be necessary. Thus, the invention makes it possible to substitute for, say, a 5-megacycle cable ten parallel cables each having a cut-off frequency of about 500 kilocycles. In the case of radio transmission, however, it will seem at first glance that no saving in band width could be obtained because of the necessity of carrier spacing. It is, therefore, a further object of my invention to provide means for simultaneously transmitting a plurality of message components (or, for that matter, a plurality of independent messages) by means of respective carrier waves occupying, with their side bands, substantially the same frequency range, said range being a fraction of that necessary for the simultaneous transmission of said message components (or messages) by conventional means.

The compression of the frequency range of each message component requires filter means to eliminate harmonics originally present but superfluous in a system according to the invention. Such harmonics elimination may be effected by ordinary, passive filter networks which, however, may introduce some distortion of signal. Thus, it is still another object of my invention to provide means for positively pre-shaping a signal wave in such manner that subsequent filtering, where necessary, will result in, at most, a negligible amount of distortion.

The invention utilizes principles partly disclosed in my co-pending application Ser. No. 275,953, filed March 11, 1952. These principles will be best understood from the following description with reference to the accompanying drawing in which.

Figure 1:
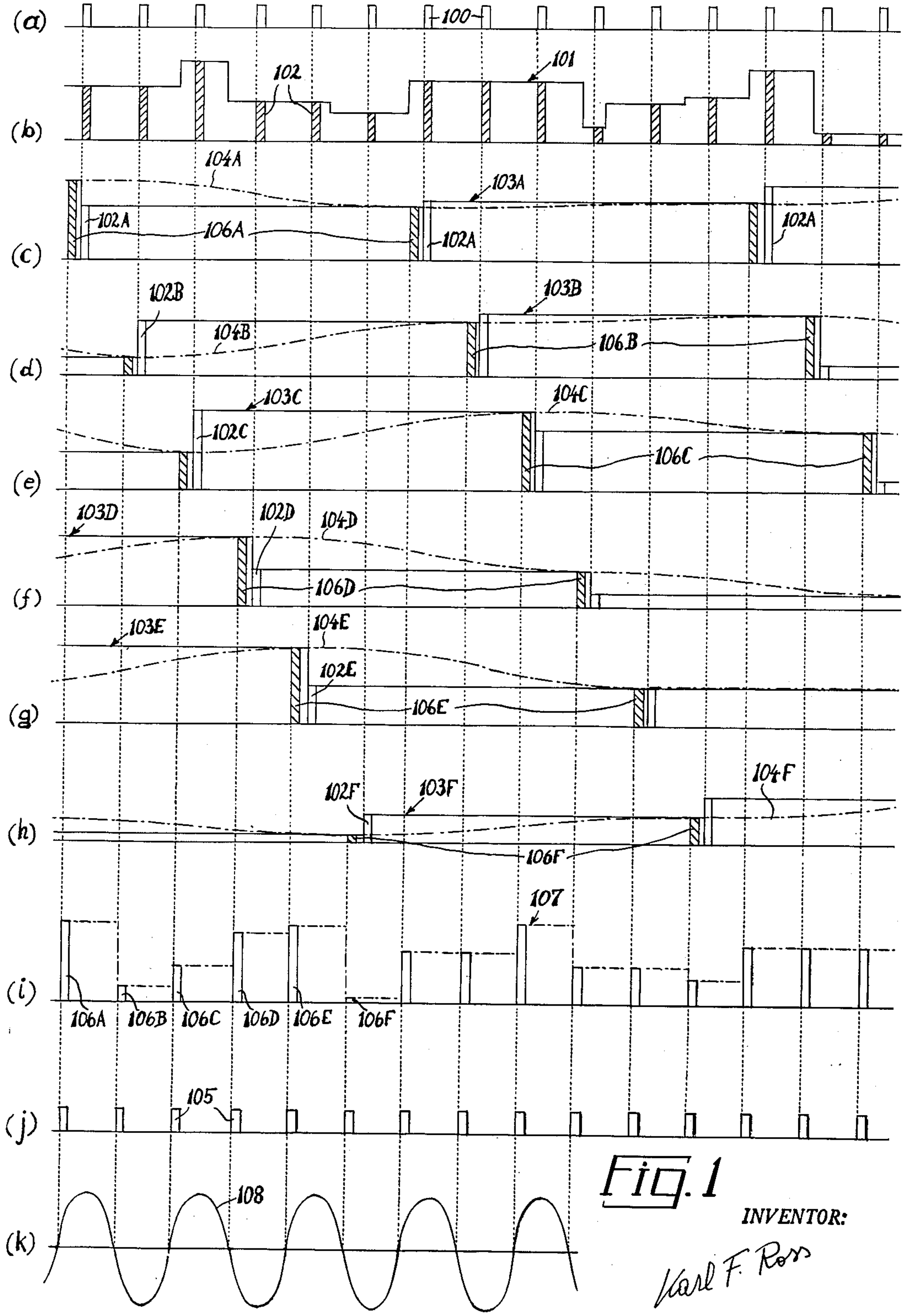
Fig. 1 is a set of graphs illustrating the coding of a high-frequency message to distribute its elements among a plurality of low-frequency message components, and the subsequent decoding of these components to reconstruct the original message.

In Fig. 1 there is shown at *a* a train of regularly spaced unblocking pulses 100 used to sample a signal wave 101, graph *b*, at uniform intervals as indicated at 102. The samplings 102 are distributed over a plurality of channels, here represented by graphs *c* through *h*, in cyclic succession as shown at 102A, 102B, 102C, 102D, 102E, 102F and are lengthened by storage to form overlapping, stepped waves 103A, 103B, 103C, 103D, 103E and 103F each consisting of a succession of rectangular steps of a duration equal to six unit lengths, a unit length being defined as the time spacing of successive pulses 100 and, if expressed in seconds, being the reciprocal of the maximum number of signal elements to be transmitted in one second. This unit length may also be given as 1/F, F being the fundamental pulse cadence and being at least approximately equal to the lowest signal frequency capable of transmitting the desired number of signal elements per second.

Before the waves 103A–103F may be transmitted over individual channels of band width F/*n* (*n* denoting the number of channels, i. e. six in the example assumed), it is necessary to eliminate the harmonics caused by their sharp steps, unless such elimination is incidental to the transmission over the channel (e. g. a cable) and is not accompanied by objectionable distortion. If the stepped waves 103A–103F are used to modulate the amplitude of a carrier of frequency $f_c$, then the desired suppression of harmonics may be obtained by passing the modulated carrier through a filter having a sharp cutoff just above frequency $f_c+F/2n$ and another sharp cutoff just below frequency $f_c-F/2n$. The result will be a carrier envelope having the form of the rounded oscillations 104A–104F shown in dot-dash lines in graphs *c* through *h*, each of these oscillations consisting, in the ideal case, of successive half-cycles of purely sinusoidal form but different amplitudes, joining one another without discontinuities, as illustrated, and having the frequency $F/2n$, or, in this particular case, F/12. Thus the band width required for the transmission of each modulated carrier will have the desired value of F/6.

The effect of the filter will be such as to delay the full buildup or ebbing of the carrier amplitude 104A etc. to its new value, as determined by the amplitude of the stepped modulating wave 103A etc,, to a time just before the end of each step of the latter wave, i, e, just before the occurrence of each pulse 100. Reference is made to graph *j* which shows a train of uniformly spaced unblocking pulses 105 having the same cadence as the pulses 100 but occurring slightly ahead of the latter, hence at a time when the amplitude of the modulated carrier at the receiver is substantially equal to that of the current step of the signal wave at the transmitter. The pulses 105 are utilized to sample the incoming waves, represented by the oscillations 104A–104F, to which they are cyclically applied, the samplings 106A–106F being then lengthened through storage and combined to form a stepped wave 107 as shown in graph *i*. This wave 107 is substantially a replica of the original signal wave 101, graph *b*, except for a time lag of the order of six unit lengths.

At *k* there is shown a pilot wave 108, of frequency F/2, from which the pulses 105 are derived in a manner known per se. This pilot wave, derived from a similar wave which gave rise to the pulses 100, can be broadcast to a plurality of receivers associated with a particular transmitting station even though these receivers may be tuned to receive different programs from said transmitting station. It is equally feasible to provide a common source of pilot wave broadcasting to a number of transmitters and receivers which, in turn, derive therefrom the pulses 100 and 105, respectively, with the aid of suitable phase shifting means. The pulses could, of course, also be obtained from a wave of frequency F instead of F/2.

Figure 2:
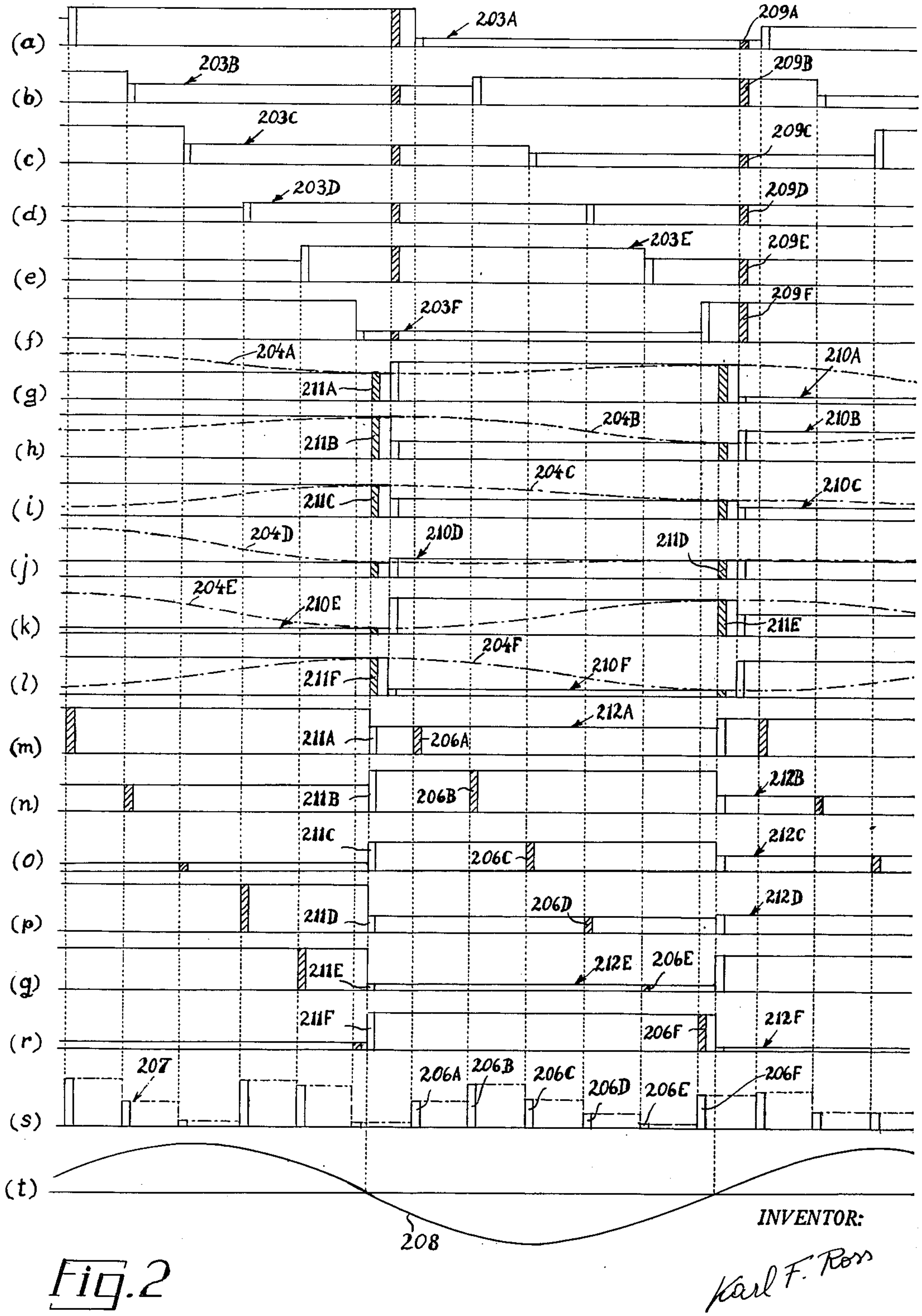
Fig. 2 is a set of graphs illustrating another mode of coding and decoding.

Fig. 2 which in graphs *a–f* shows six overlapping stepped waves 203A–203F corresponding to waves 103A–103F of Fig. 1, illustrates a different mode of transmission and demodulation. Thus, waves 203A–203F may be assumed to have been derived from the original signal wave, such as wave 101 in Fig. 1, by an initial sampling process as heretofore described. Inasmuch as all six waves overlap for an interval of unit length, i. e. for a period equal to one-sixth of the duration of each step, they may be subjected to a second, simultaneous sampling process as indicated at 209A–209F to produce pulses from which, again by storage, stepped waves 210A–210F having coincident discontinuities are derived as shown in graphs *g*–1. It will thus be observed that each of the waves 210A–210F is identical with the corresponding one of waves 203A–203F, but with a time delay which progressively decreases from wave 210A to wave 210F.

The waves 210A–210F are converted into sinusoidal oscillations 204A–204F, in the manner previously referred to, which are in exact phase or phase opposition with respect to one another as compared with the progressive phase displacement of waves 104A–104F in Fig. 1. The oscillations 204A–204F are sampled substantially at their crests, i. e. just ahead of the discontinuities of the corresponding stepped waves 210A–210F, as indicated at 211A–211F; this gives rise to the simultaneously occurring pulses 211A–211F of graphs *m–r* which are utilized to recreate, with a time lag of approximately six units, the stepped waves 210A–210F as shown at 212A–212F. The latter waves are then sampled at staggered intervals, as indicated at 206A—206F, and a replica of the original signal is reproduced at 207 as shown in graph *s*. A pilot wave 208, having one-sixth the frequency of wave 108 in Fig. 1, goes through zero at six-unit intervals to fix the time of occurrence of the sample pulses 211A–211F; the sample pulses 206A–206F can also be readily derived from wave 108 by frequency multiplication and phase shifting, to produce a suitably phased wave of frequency F/2 (similar to wave 108 of Fig. 1) or F.

Figure 3:
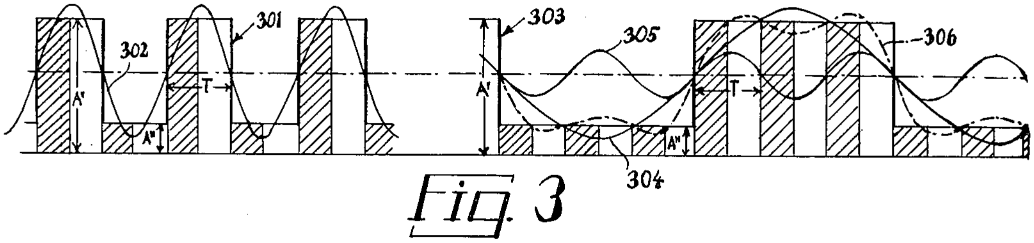
Fig. 3 is a graph illustrating the distortion liable to be introduced by a passive filter network when used in the coding process.

It will thus be seen that it is possible, in accordance with the present invention, to transmit a message normally occupying a frequency band W over *n* parallel channels each with a frequency band substantially equal to $W/n$. This assumes, however, the use of nearly perfect filters adapted to eliminate all higher harmonics to a sufficient degree to prevent them from becoming a source either of distortion or of interference with other messages that might be transmitted over the same communication medium. Since a sharp enough cutoff may be more readily achieved at the signal frequency level rather than at the carrier level, it would be advantageous to transform a stepped signal wave such as 103A into a rounded oscillation similar to envelope 104A before modulating the carrier therewith. Fig. 3 shows at 301 a portion of a stepped signal wave representing a simple though somewhat extreme case of successive steps, each of unit length T, alternately of a large amplitude A′ and a small amplitude A″. Fourier analysis yields, in addition to a D.-C. component, a fundamental wave 302 of frequency ½T and a series of odd harmonics which can be removed by low-pass filtering and which have not been illustrated. If, therefore, the wave 301 is passed through a low-pass filter eliminating all frequencies substantially higher than the frequency ½T, there will be obtained a sinusoidal wave such as 302 (but possibly displaced in phase with respect thereto) having a peak amplitude which is given by the expression $4(A'-A'')/\pi$, knowledge of this factor thus enabling reconstruction of the stepped wave 301 from the peaks of the sinusoidal wave.

Another extreme but simple case is shown at the right in Fig. 3 where a different portion 303 of a stepped wave comprises groups of three steps of uniform amplitude, successive groups (of total length 3T) alternating again between large amplitude A′ and small amplitude A″. Fourier analysis here produces the same D.-C. component, a fundamental wave 304 of frequency ⅙T, a third harmonic 305 of frequency ½T, and higher harmonics which will be eliminated if the wave is passed through the aforementioned filter. The amplitude of the fundamental 304 is again given by $4(A'-A'')/\pi$, that of the third harmonic 305 by $4(A'-A'')/3\pi$; wave 306, shown in dot-dash lines, represents the sum of the amplitudes of both waves 304, 305 and at no point reaches the peak value of $4(A'-A'')/\pi$ attained by the wave 302, as will be apparent. Thus, the formula used in determining the amplitude of the stepped wave on the basis of an oscillation such as 302 will fail in the case of an oscillation such as 306 which is passed by the same filter; phase shift phenomena, determined by the transmission characteristic of the filter network, as well as the presence of a D.-C. component of a magnitude variable from cycle to cycle may introduce further distortion. The longer the series of successive steps of uniform amplitude, the closer will the amplitude of the filter output approach the amplitude of the wave steps. The latter source of distortion may be eliminated by interrupting the stepped wave for half-step intervals, thereby producing a wave consisting of the hatched portions of stepped wave 301 or 303; this, however, results in a fundamental frequency equal to 1/T, thereby doubling the frequency band required. Since in such case the fundamental frequency will be quite marked, it will be possible to dispense with the transmission of a separate pilot wave.

Figure 4:
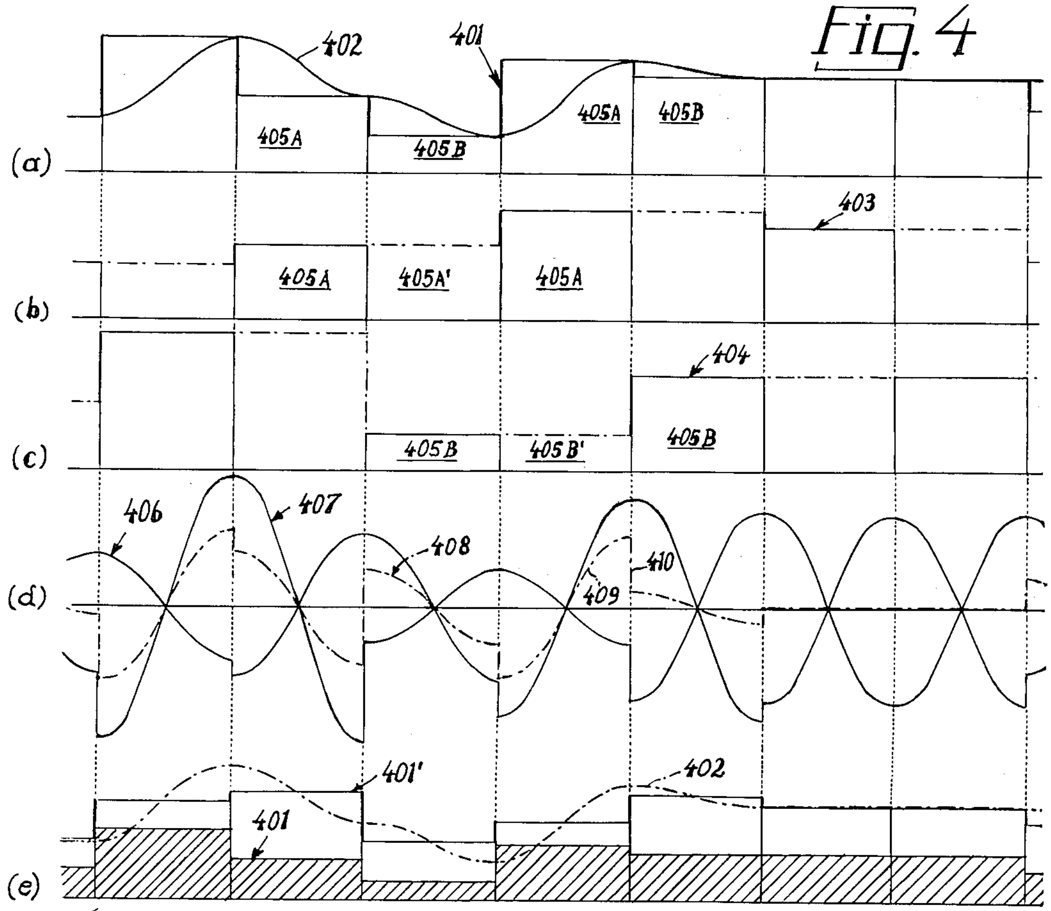
Fig. 4 is a set of graphs illustrating the pre-shaping of a signal wave in the coding process according to a feature of the invention.

Another method of eliminating the distortions referred to, which may be of advantage where extremely high fidelity of reproduction is desired, has been illustrated in Fig. 4 At 401 there is shown in graph *a* a stepped wave which is to be converted into a sinusoidal oscillation 402 having peaks or level portions coincident with the discontinuities of wave 401 and being of the same amplitude as the latter wave just ahead of said discontinuities. In accordance with this feature of my invention the stepped wave 401 is split into two stepped waves 403, graph *b*, and 404, graph *c*. Alternate steps 405A and 405B of wave 401 go into the waves 403 and 404, respectively, each step being doubled in length, as indicated in dot-dash lines at 405A, 405A'', to fill the gap left by the omission of the step immediately following. Thus the steps of waves 403 and 404 overlap for periods equal to the basic length T of an original step.

Two sine waves of frequency ½T and opposite phase, whose peaks coincide with the discontinuities of original wave 401, are modulated by the waves 403 and 404, respectively, as indicated at 406 and 407, graph *d*. When these two modulated waves are differentially combined, there results an oscillation 408 consisting of sinusoidal half-cycles 409 separated by discontinuities 410 which coincide with the discontinuities of original wave 401. Graph *e* shows superimposed upon the wave 401 a second stepped wave 401' which corresponds to wave 401 delayed by the duration T of one step; wave 401' is obtained by combining the portions 405A' and 405B', shown in dot-dash lines, of waves 403 and 404, respectively. The combination of the two waves 401 and 401' results in a stepped wave having discontinuities exactly equal and opposite to the steps 410 of wave 408 in graph *d*. If, now, wave 408 is superimposed upon the stepped wave so formed, there results the continuous, sinusoidal wave 402 of graph *a*. It should be noted that the amplitudes of waves 401 and 401' in graph *e* have been halved with respect to those of wave 401 in graph *a* and that the amplitudes of wave 408, graph *d*, have also been reduced by one-half, yet that the resulting wave 402 in graph *e* has the same amplitudes as wave 402 in graph *a*.

The derivation of wave 402 from wave 408 could also have been accomplished, substantially, without the addition of wave 401'; in that case the superposition of waves 401 and 408 would have yielded a wave generally following the course of wave 402 but still retaining discontinuities which would have to be elminated by low-pass filtering. With this modification the method just described with reference to Fig. 4 has already been disclosed in my aforementioned co-pending application Ser. No. 275,953. The more elaborate method including use of wave 401', however, dispenses with all passive filter networks in producing the desired oscillation.

Although the wave 402 consists only of sine wave sections of constant frequency ½T, in addition to a D.-C. component, it has a discontinuous derivative which upon passage through a strongly reactive circuit will introduce harmonics and, hence, distortion. This drawback will not exist where such wave is used to modulate a high-frequency carrier, since in that case the discontinuities will exist only in the derivative of the carrier envelope and will not materially affect the sinsoidal character of the carrier voltage. A modification of the method of Fig. 4, adapted to synthesize a substantially sinusoidal wave without D.-C. component, has been illustrated in Fig. 5.

Figures 5, 12, 13:
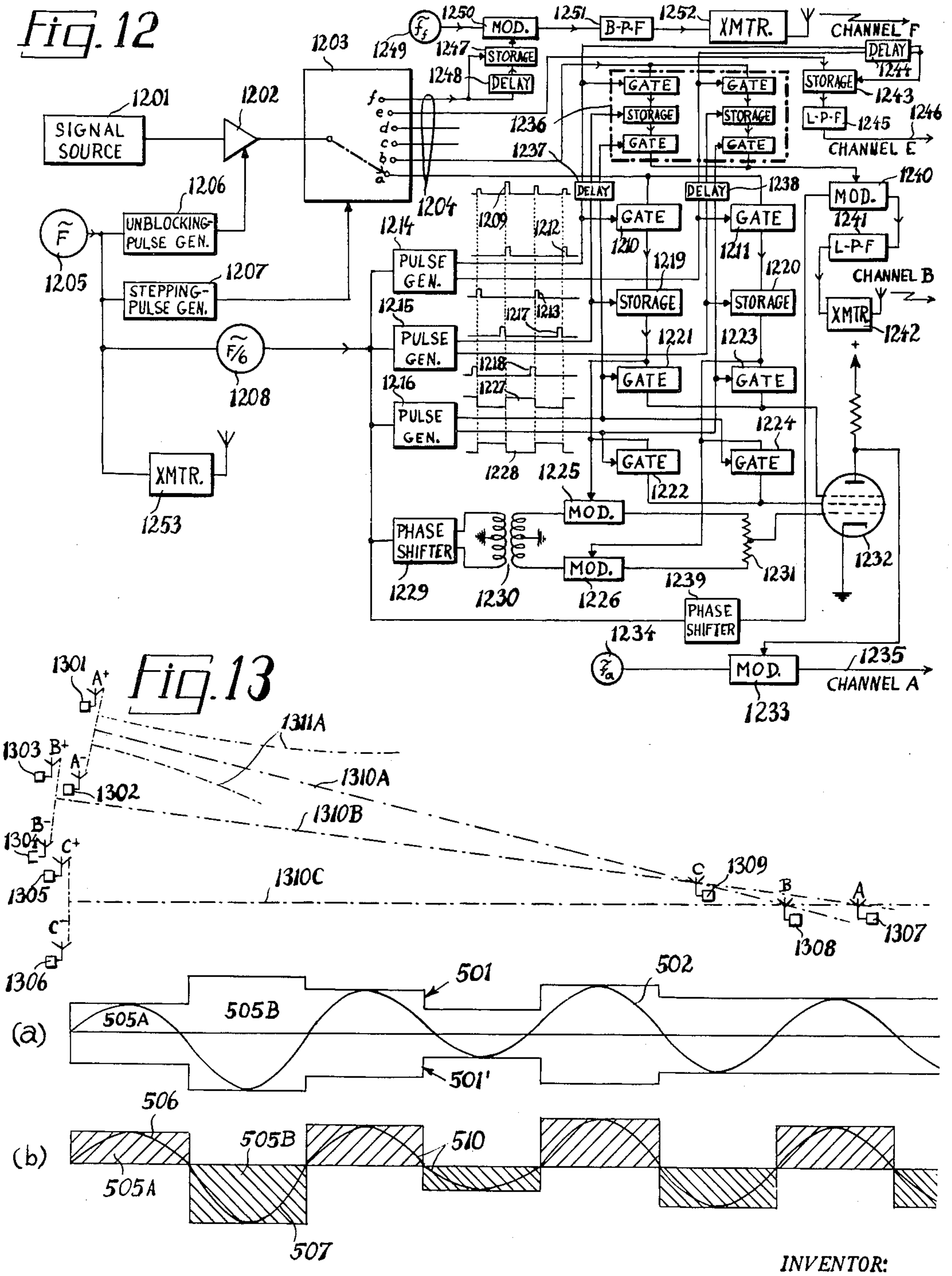
Fig. 5 is a set of graphs illustrating a different mode of pre-shaping a signal wave.
Fig. 12 is a circuit diagram showing an arrangement for synthesizing a wave according to Figs. 3–5.
Fig. 13 diagrammatically shows a telecommunication system utilizing still another mode of simultaneous radio transmission over a plurality of channels.

In Fig. 5 there is shown at *a* a stepped wave 501 which is somewhat similar to the wave 401 of Fig. 4, along with a stepped wave 501' representing the negative image of wave 501. Wave 502, representing an amplitude-modulated carrier of frequency ½T, has positive and negative peaks alternately coinciding with the steps of waves 501 and 501', respectively; it will be understood that from said wave 502 there could thus be reconstructed, after full-wave rectification, the stepped wave 501. Wave 502 occupies a frequency band ranging from zero to 1/T.

Graph *b* of Fig. 5 shows alternate half-cycles 506, 507 of a sine wave of frequency 1/2T modulated by the steps 505A, 505B of wave 501. The oscillation composed of these modulated half-cycles 506, 507, which taken by themselves are purely sinusoidal, has discontinuities at 510 which signify the presence of higher harmonics. These harmonics, however, can be readily eliminated by a smoothing network, which may have the characteristics of a low-pass filter with cutoff just beyond the frequency 1/T, to produce the wave 502 without material distortion of the amplitudes at the wave peaks.

When a wave such as 302 or 502 is used to modulate a carrier, it will be necessary to take into account the phase relationship between the peaks of the sinusoidal oscillation and the steps of the original signal wave which will generally be different from the phase relationship discussed in connection with Figs. 1 and 2; thus the phasing of the unblocking pulses such as 106A–106F or 211A–211F will have to be suitably modified. It should further be understood that these waves, as well as a wave such as 402, may also be used for modulating a carrier in phase or in frequency, rather than in amplitude, again with considerable reduction in band width as compared with conventional high-fidelity transmission by such modulation. It may be mentioned, however, that the mode of demodulation used in accordance with the present invention, including the use of precisely timed decoding or unblocking pulses, minimizes noise interference so as to afford satisfactory reception even in the case of amplitude-modulated carriers.

It will thus be seen that the invention envisages the use of direct transmission or of carrier transmission and that either a metallic circuit or the ether may serve as the transmission medium. It now remains to be shown how in the latter case, i. e. with radio transmission, interference between different channels using substantially the same frequency band may be avoided.

In my co-pending application Ser. No. 757,611, filed June 27, 1947, now Patent No. 2,619,547, issued November 25, 1952, I have disclosed a method of determining the peak amplitudes X and Y of two simultaneously transmitted carries $X \sin \omega t$ and $Y \cos \omega t$ with the aid of a time signal indicating the instants when the sine and the cosine function, respectively, goes through zero. This principle may be extended to embrace the more general case of any fixed phase displacement $\phi$, not necessarily equal to 90°, existing between the two waves, with the aid of time signals occurring at predetermined intervals so as to yield two amplitudes $$A = X \sin \omega t_1 + Y \sin (\omega t_1 + \phi)$$
$$B = X \sin \omega t_2 + Y \sin (\omega t_2 + \phi)$$

from which the values of $X$ and $Y$ may be determined mathematically or electrically.

This method fails, however, in the case of three or more waves of like frequency and different phase, since here the determinant such as $$\begin{vmatrix} \sin \omega t_1 & \sin (\omega t_1 + \phi_1) & \sin (\omega t_1 + \phi_2) \\ \sin \omega t_2 & \sin (\omega t_2 + \phi_1) & \sin (\omega t_2 + \phi_2) \\ \sin \omega t_3 & \sin (\omega t_3 + \phi_1) & \sin (\omega t_3 + \phi_2) \end{vmatrix}$$

becomes homogeneous and, therefore, the solution will be indefinite.

It is, however, possible to mix carries of like or closely spaced frequencies in such manner that there can be derived therefrom, with the acid of suitable timer pulses, a sufficient number of parameters whose determinant will not vanish and which will, therefore, enable determination of the individual carrier amplitudes. One solution involves the use of slightly different carrier frequencies; this, for $n$ different channels, yields the equations $$A_1 = X_1 \sin \omega_1 t_1 + X_2 \sin \omega_2 t_1 + \ldots + X_n \sin \omega_n t_1$$
$$A_2 = X_1 \sin \omega_1 t_2 + X_2 \sin \omega_2 t_2 + \ldots + X_n \sin \omega_n t_2$$
$$\text{-----------------------------------}$$
$$A_n = X_1 \sin \omega_1 t_n + X_2 \sin \omega_2 t_n + \ldots + X_n \sin \omega_n t_n$$

(neglecting any initial phase displacement between the carries, which may or many not be present, this relationship enabling determination of the unknown amplitudes $X_1 \ldots X_n$ from the known values for $A_1 \ldots A_n$ measured at the predetermined instants $t_1 \ldots t_n$.

Figure 6:
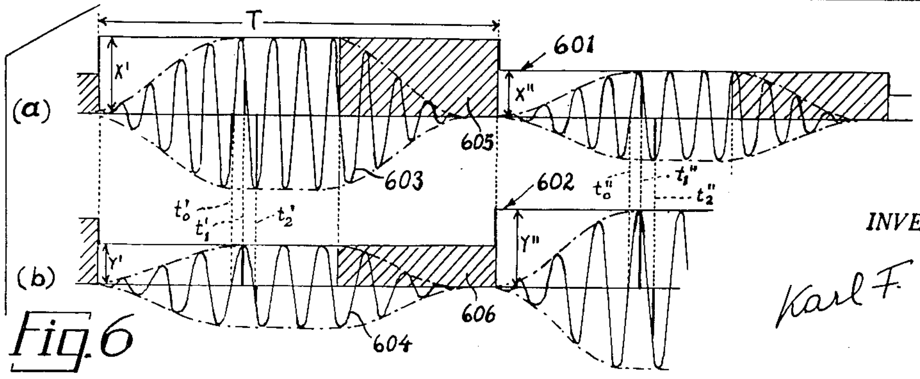
Fig. 6 is a set of graphs illustrating one mode of simultaneous transmission by different carrier waves.

For a correct evaluation of the measured values it is essential that the sampling of the composite wave be carried out at a time when the amplitude of each carrier has been substantially stabilized, i. e. toward the end of each modulating step. Furthermore it is necessary to maintain the same initial phase relationship between the carriers at the beginning of each sampling cycle. Reference is made to Fig. 6 showing two stepped signal waves whose amplitudes are to be simultaneously transmitted with the aid of two superimposed carriers of slightly differing frequencies; it is to be understood that the same principles may be employed in connection with three or more signal waves and carriers.

In Fig. 6 there is shown at *a* a signal wave 601 having a first step of amplitude X′ and a second step of amplitude X″; graph *b* illustrates another signal wave 602, whose steps coincide with those of wave 601 and include a first step of amplitude Y′ and a second step of amplitube Y″. A carrier 603 of frequency $f_1=\omega_1/2\pi$ is modulated in amplitude by the stepped wave 601, a carrier 604 of frequency $f_2=\omega_2/2\pi$ being similarly modulated in amplitude by the stepped wave 602. The modulation, however, is carried out in such manner that the carrier amplitude, starting from zero at the beginning of the cycle, reaches a value corresponding to the amplitude of the stepped wave after an interval which is less than one-half the length T of a step or cycle, thereafter remains stationary for a short period and finally drops to zero at the end of the cycle. Both the rise and the fall of the carrier amplitude proceed along a sine curve as previously described; it will be understood from the preceding discussion that this may be readily accomplished with the aid of the method of Fig. 4 by using two carrier waves (such as 406, 407) of frequency 3/2T and supressing the last third of each step (to cause the decrease in carrier amplitude toward zero). This triples the band width required per channel so that for an original frequency band F and $n$ channels, as previously assumed, each channel would require a frequency range equal to $3F/n$; with a large number of channels, however, there would still be obtained a substantial reduction in total band width since it should be borne in mind that the several carrier frequencies need to differ only by a small fraction of the individual channel band $3F/n$ in order to give rise to non-homogeneous determinants.

The periodic reduction of the carrier amplitude to zero, following the reaching of a plateau at which samples can be taken, is necessary in order to enable resumption of carrier oscillations with the same phase at the beginning of each cycle. At 605 and 606 there is shown a blocking pulse (hatched) serving to suppress the last portion of each step of wave 601 or 602, respectively. The illustrated envelope of carrier 603 or 604 may also be obtained, in a manner already suggested, by the use of band-pass filters having a sharp cutoff just above and below the frequencies $f_c \pm 3F/2n$ (or, more generally, somewhat above and below the frequencies $f_c \pm F/n$), the carrier frequency $f_c$ having the value $f_1$ in the case of wave 603 and the value $f_2$ in the case of wave 604. Thus, when the blocking pulse such as 605 is lifted, the oscillator generating the carrier 603 starts to build up its amplitude to the level determined by the current step of signal wave 601 which it reaches after a time somewhat less than T/2; shortly thereafter the next blocking pulse is applied and the filter in the output circuit of the oscillator causes the oscillations to decay to zero after an interval which is substantially the same as the build-up time. The trailing edge of the blocking pulse may, if necessary, be arranged to coincide with a special start impulse designed to excite the oscillator with the proper phase at the beginning of a new cycle. This trailing edge, as will be readily understood, may conveniently be synchronized by means of pulses such as 100, Fig. 1(*a*), to coincide with the beginning of each new step, in which case the pulses 100 may also serve as the start impulses.

In the example illustrated in Fig. 6 it has been assumed that at a predetermined time within each cycle, shown at $t_0'$ for the first and at $t_0''$ for the second cycle, both carriers 603 and 604 go through zero, this being the reference time for determining the individual amplitude components X, Y by sampling the combined wave at subsequent instants $t_1'$, $t_2'$ and $t_1''$, $t_2''$. Thus, if the amplitudes measured at the instants $t_1'$ and $t_2'$ are $A_1'$ and $A_2'$, respectively, then the amplitudes X′ and Y′ may be determined therefrom according to the equations $$A_1' = X' \sin \omega_1 t_1' + Y' \sin \omega_2 t_1'$$
$$A_2' = X' \sin \omega_1 t_2' + Y' \sin \omega_2 t_2'$$

and, similarly, from the amplitudes $A_1''$ and $A_2''$ measured at the instants $t_1''$ and $t_2''$, respectively, the amplitudes X″ and Y″ may be ascertained from the analogous equations $$A_1'' = X'' \sin \omega_1 t_1'' + Y'' \sin \omega_2 t_1''$$
$$A_2'' = X'' \sin \omega_1 t_2'' + Y'' \sin \omega_2 t_2''$$

Let $$\sin \omega_1 t_1' = \sin \omega_1 t_1'' = \sin \omega_1 t_1 = K_1$$
$$\sin \omega_2 t_1' = \sin \omega_2 t_1'' = \sin \omega_2 t_1 = K_2$$
$$\sin \omega_1 t_2' = \sin \omega_1 t_2'' = \sin \omega_1 t_2 = K_3$$
$$\sin \omega_2 t_2' = \sin \omega_2 t_2'' = \sin \omega_2 t_2 = K_4$$

Then we can write, generally, for each cycle:

$$A_1 = K_1 X + K_2 Y$$
$$A_2 = K_3 X + K_4 Y$$

giving the solution $X=D_x/D$, $Y=D_y/D$ wherein $$D = \begin{vmatrix} K_1 K_2 \\ K_3 K_4 \end{vmatrix} = K_1K_4 - K_2K_3$$

$$D_x = \begin{vmatrix} A_1 K_2 \\ A_2 K_4 \end{vmatrix} = A_1K_4 - A_2K_2$$

$$D_y = \begin{vmatrix} K_1 A_1 \\ K_3 A_2 \end{vmatrix} = K_1A_2 - K_3A_1$$

Hence the values of X and Y at each cycle may be readily determined electrically, from the measured values $A_1$ and $A_2$, by differentially combining a fixed fraction of $A_1$, equal to $A_1K_1/D$, with a fixed fraction of $A_2$, equal to $A_2K_2/D$, and by differentially combining another fixed fraction of $A_1$, equal to $A_1K_4/D$, with another fixed fraction of $A_2$, equal to $A_2K_2/D$, respectively.

Whereas for a larger number of carriers the determinants D, $D_x$, $D_y$ etc. will become more complex, their mathematical solution will always lead to a number of fixed multiplication factors by which the sampled amplitudes may be electrically multiplied, followed by additive and/or differential combination of the resulting voltages to reproduce the original signal amplitudes X, Y etc.

Figure 7:
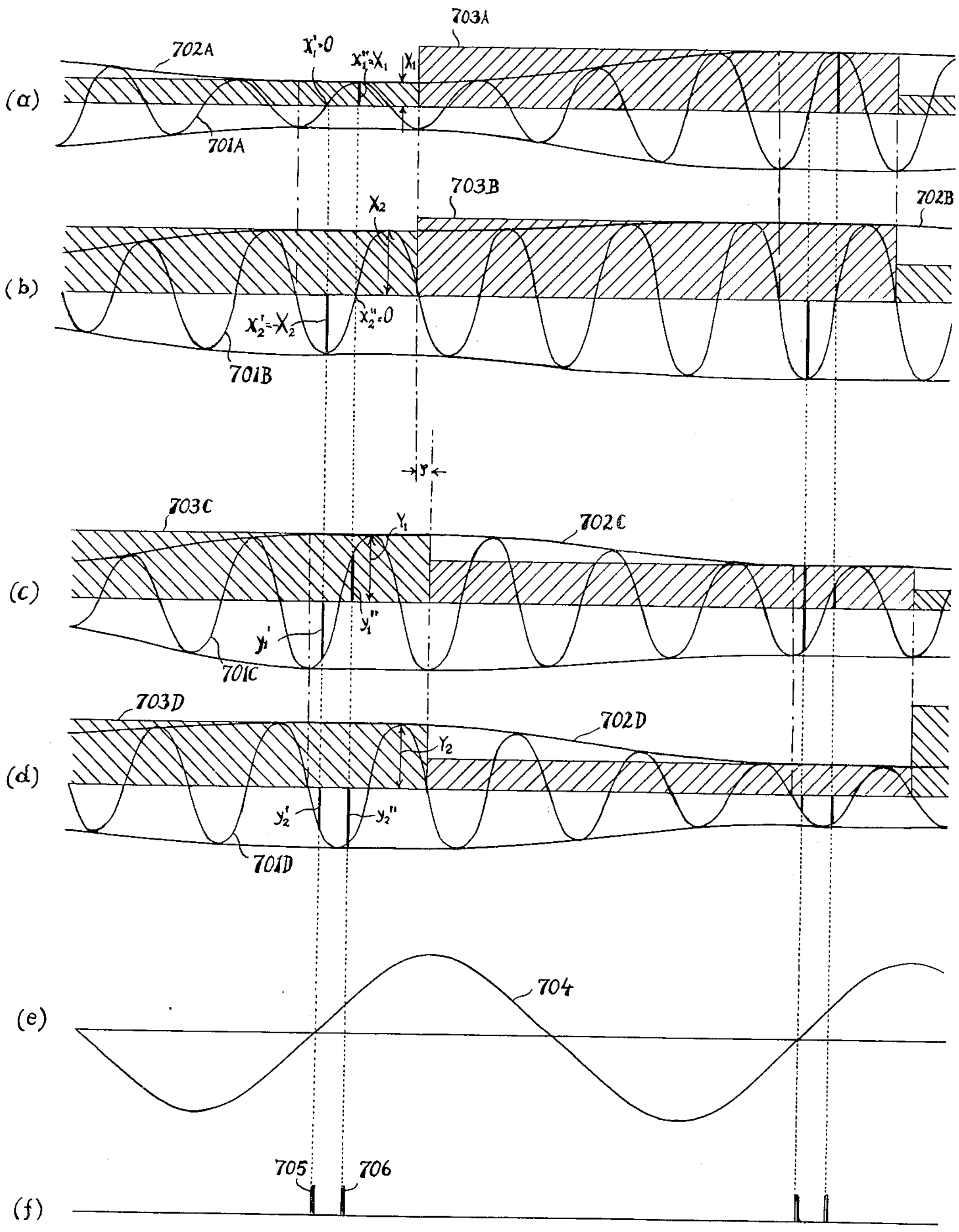
Fig. 7 is a set of graphs illustrating another mode of simultaneous transmission by different carrier waves.

Fig. 7 illustrates the operation of a communication system according to the invention wherein, in contradistinction to the one just described, a single frequency $f_c$ is used for all carriers but characteristic phase shifts are introduced by virtue of the fact that these carriers originate at spaced locations and that reception also takes place at spaced points. With this arrangement, furthermore, the principles disclosed in my co-pending application Ser. No. 757,611 above referred to, now Patent No. 2,619,547, may be utilized in that some or all of the carriers emitted by the several transmitting stations may be composite waves having two components with a relative phase displacement of, preferably, 90 degrees.

Fig. 7 shows four carrier waves 701A, 701B, 701C, 701D, illustrated in graphs *a*, *b*, *c* and *d*, respectively. Waves 701 and 702 are relatively dephased by 90° and are deemed to originate at one transmitter, waves 703 and 704 being similarly dephased and originating at a second transmitter geographically spaced from the first one. The carriers are amplitude-modulated with sinusoidal envelopes 702A–702D which are similar to the envelopes 104A etc. of Fig. 1 and are derived from stepped signal waves 703A–703D similar, in turn, to the stepped waves 103A etc. Since, in this case, not more than two samplings are required for each cycle, regardless of the number of carriers involved, it is not necessary here to provide an extended plateau amplitude as shown in Fig. 6.

Let us assume, for the sake of simplicity, that two transmitting stations S*x*, S*y* define one of the short sides of a rectangle whose opposite, short side is defined by two receiving stations S*a*, S*b*. The distances S*x*—S*a* and S*y*—S*b*, corresponding to the two longer sides of the rectangle, are equal and are somewhat less than the distances S*x*—S*b* and S*y*—S*a* which correspond to the diagonals. Disregarding, for the moment, the carriers 701B, 701D and assuming that the carriers 701A, 701C are in phase when transmitted by the stations S*x* and S*y*, respectively, then the carrier 701A will lead the carrier 701C by a phase angle $\phi$ when arriving at station S*a* but will lag behind carrier 701C by a like phase angle when arriving at station S*b*.

A pilot wave 704, graph *e*, is an exact submultiple of each carrier wave 701A–701D and has a period equal to the length T of any step of signal waves 703A–703D. It is assumed that wave 704 is emitted by station S*x* with a phase such as to go through zero when the wave 701A does likewise, and that, therefore, this wave when arriving at each receiving station will also be in step with the component corresponding to wave 701A of any composite wave received there.

Fig. 7 shows the waves 701C and 701D lagging by a phase angle $\phi$ behind the waves 701A and 701B, this being the situation previously decribed for receiving station S*a*. A pair of sampling pulses 705, 706 are periodically generated at the receiver under the control of the incoming pilot wave 704, as shown in graph *f*. Pulse 705 occurs at the beginning of the positive half-cycle of wave 704, pulse 706 following with a delay equal to $\frac{1}{4}f_c$ corresponding to a 90° phase angle of the carrier waves. Thus, at the time of pulse 705 the amplitude A′ measured at station S*a* consists of four components $x_1'=X_1 \sin \omega t_1$, $x_2'=-X_2 \cos \omega t_1$, $y_1'=Y_1 \sin (\omega t_1-\phi)$ and $y_2'=-Y_2 \cos (\omega t_1-\phi)$, whereas at the time of pulse 706 the amplitude A″ measured at the same station consists of four components $x_1''=X_1 \sin \omega t_2$, $x_2''=-X_2 \cos \omega t_2$, $y_1''=Y_1 \sin (\omega t_2-\phi)$ and $y_2''=-Y_2 \cos (\omega t_2-\phi)$. Since, moreover, in the case shown $t_1=0$ and $t_2=\pi/2\omega$, the following simplified relationships obtain:

(At station S*a*)

$$A'=0-X_2-Y_1 \sin \phi-Y_2 \cos \phi$$
$$A''=X_1+0+Y_1 \cos \phi-Y_2 \sin \phi$$

(and at station S*b*, where the sign of $\phi$ is reversed)

$$B'=0-X_2+Y_1 \sin \phi-Y_2 \cos \phi$$
$$B''=X_1+0+Y_1 \cos \phi+Y_2 \sin \phi$$

from which relationships the values of the signal amplitudes $X_1$, $X_2$ at transmitter S*x* and $Y_1$, $Y_2$ at transmitter S*y* may be determined in the manner discussed in connection with Fig. 6. It may be mentioned that in the most general case the phase displacement between conjugate carriers, such as 701A and 701B, need not be 90° and that the spacing of the decoding pulses such as 705, 706 may likewise be different from $\pi/2\omega$.

Figures 8, 9, 10:
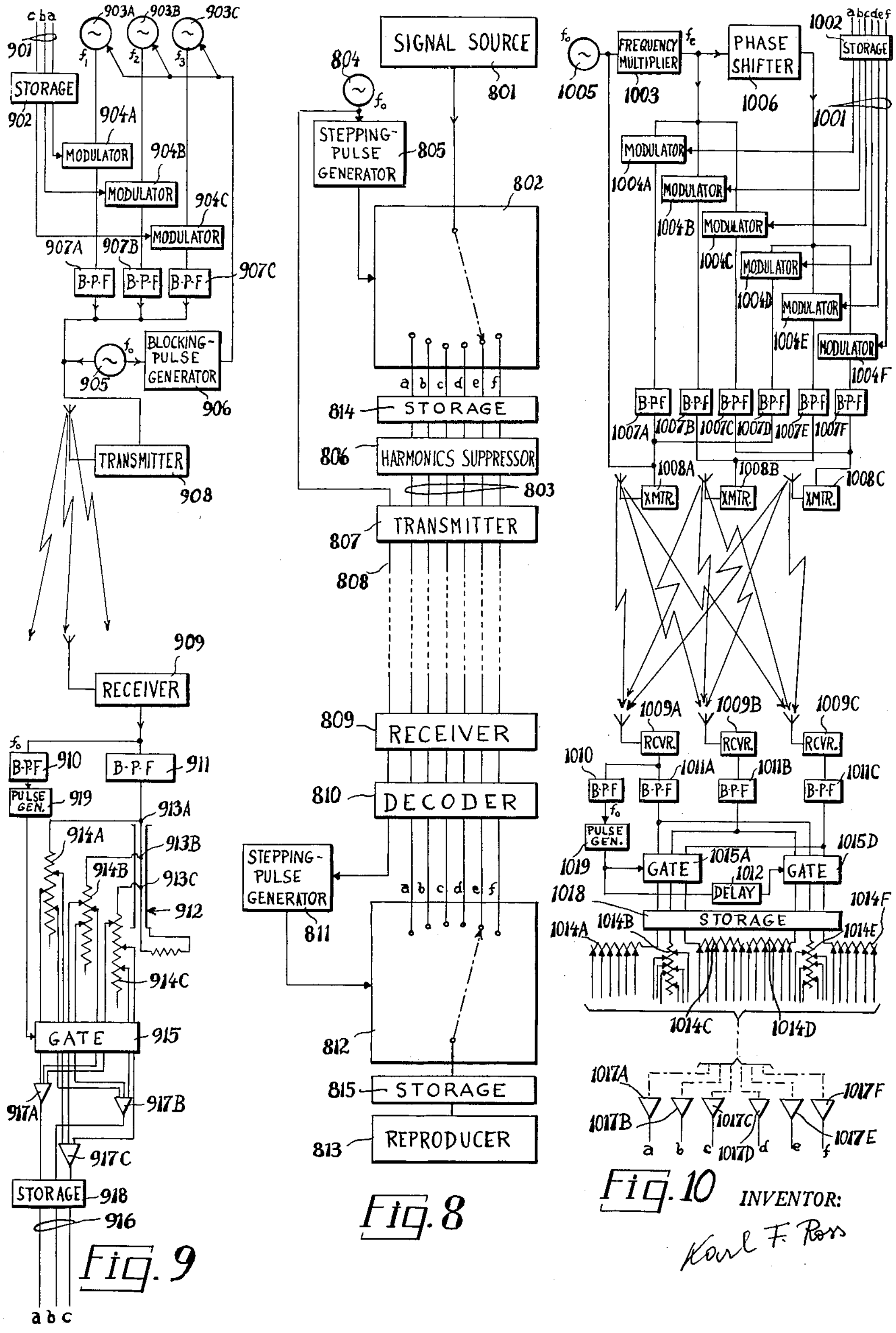
Fig. 8 is a circuit diagram illustrating an overall communication system embodying the principles according to the invention.
Fig. 9 is a circuit diagram showing a communication system utilizing the mode of transmission illustrated in Fig. 6.
Fig. 10 is a circuit diagram showing a communication system utilizing the mode of transmission illustrated in Fig. 7.

Fig. 8 illustrates the overall organization of a communication system according to my present invention. A signal source 801 works into an electronic switch 802 which cyclically distributes successive signal portions, e. g. in the form of pulses such as 102 in Fig. 1, over six channels 803 designated *a*, *b*, *c*, *d*, *e* and *f*. The channels 803 may comprise metallic circuits or radio links; in the latter case use may be made of mixed carriers, as just described in connection with Figs. 6 and 7, or of conventional channel spacing means such as frequency separation. While in the last-mentioned instance the advantages of reduced band width and/or of a wide broadcasting range will be lost, it may nevertheless be desirable to apply the channel method according to the invention to such conventional communication system for secrecy purposes. For the sake of completeness it may also be mentioned that the channels may consist of sharply directive beams, in which case the benefit of a small band width will be retained although, of course, the range advantages inherent in the use of longer waves will not be obtainable.

An oscillator 804 produces a pilot wave, of frequency $f_c$, which may be similar to wave 108, 208 or 704 and excites a stepping-pulse generator 805 which in turn controls the electronic switch 802. The signals transmitted over the channels 803 pass through a storage circuit 814, as well as through a harmonics suppressor which has been schematically illustrated as a block 806 and which may form part of the channels 803 themselves, as in the case of metallic circuits having a suitable frequency cutoff as already pointed out, or which may comprise separate filter networks as mentioned in connection with Figs. 3 and 6 or special synthesizing circuits as discussed with reference to Figs. 4 and 5. The transmitter 807, which in addition to sending out the message signals over channels 803 also emits the pilot frequency $f_0$ by way of a special channel 808, may consist of several physically spaced transmitting stations as described in connection with Fig. 7; similarly, the receiver 809 representing the geometrical but not the electrical termination of channels 803 and 808 may consist of a plurality of individual stations.

The received signals pass through a decoder 810 which, in the manner previously described in connection with Figs. 1, 2, 6 and 7, determines the amplitudes of the original signal components under the control of the pilot wave transmitted over channel 808. This pilot wave also actuates a stepping-pulse generator 811 controlling an electronic switch 812 which is stepped in synchronism with switch 802 at the transmitter, though possibly with a certain phase displacement, to feed a storage circuit 815 and thence a reproducer 813 serving to duplicate the output of source 801.

It will be understood that the storage circuit 814 serves to lengthen the short sampling pulses in the output of switch 802 into steps of a wave such as 103A, 210A, 301, 401, 501, 601 or 703A, and that the harmonics suppressor 806 converts these stepped waves into sinusoidal oscillations 102A, 204A, 302, 402, 502, 603 (envelope) or 702A as illustrated in Figs. 1–7. More detailed circuit arrangements for carrying out these conversions are shown in Fig. 12 and will be described in connection therewith. In similar manner, the storage circuit 815 serves to lengthen the output pulses from switch 812, which may have the form shown at 106A or 206A, into steps of a wave such as 107 or 207 (Figs. 1 and 2).

Fig. 9 shows a more specific embodiment functioning in the manner described with reference to Fig. 6. The individual signal components, arriving over conductors 901 labeled *a*, *b* and *c*, are received by a storage circuit 902 which converts the several pulse trains into stepped waves of the type shown at 601 and 602. Three generators 903A, 903B, 903C produce carrier frequencies $f_1$, $f_2$, $f_3$, respectively; each of these carriers passes through a separate modulator 904A, 904B, 904C in which it is modulated in amplitude by the stepped wave from a respective one of the channels 901. An oscillator 905 generates a pilot wave of frequency $f_0$ which actuates a blocking-pulse generator 906, the latter producing the pulses such as 605, 606 which periodically inactivate the generators 903A, 903B, 903C so as to re-start them with a predetermined phase relation to one another and to oscillator 905, for reasons discussed in connection with Fig. 6. The intermittent output of each modulator 904A–904C is passed through a respective band-pass filter 907A, 907B, 907C and is then fed, together with the output of pilot wave oscillator 905, to a transmitter 908 for radiation toward a receiver 909.

The output of receiver 909 is applied, in parallel, to two band-pass filters 910 and 911, the first serving to isolate the pilot wave of frequency $f_0$, the second having a pass band wide enough to accommodate the three modulated carriers $f_1$, $f_2$, $f_3$ which with their side bands occupy overlapping frequency ranges. A delay network, shown here as a coaxial line 912, is tapped at points 913A, 913B, 913C in order to enable time-spaced pulses, such as indicated at $t_1'$ and $t_2'$ in Fig. 6, to be simultaneously derived from the output of filter 911 by means of a pulse generator 919. Three potentiometers 914A, 914B, 914C, each with three taps, are respectively connected to the branching points 913A, 913B, 913C, the leads from these potentiometer taps passing through a gate circuit 915 which is controlled from the pilot wave, as isolated by the filter 910, in such manner as to be unblocked only for a brief period during each cycle. Three incoming channel leads 916, corresponding to outgoing channel leads 901 and designated, likewise, *a*, *b* and *c*, extend from the outputs of respective amplifiers 917A, 917B, 917C each of which has three input electrodes connected to a respective tap on each of the potentiometers 914A–914C. A storage circuit 918 inserted in these channel leads 916 serves to lengthen the short pulses applied to them by the amplifiers with each opening of the gate 915, in the manner illustrated in Figs. 1*i* and 2*s*. It will be understood that the setting of the potentiometer taps is established with the aid of the determinants of coefficients such as $K_1$ etc. discussed in connection with Fig. 6. The channel leads 916 may, of course, extend to an integrating circuit including, for example, an electronic stepping switch such as shown at 812 in Fig. 8.

Fig. 10 illustrates a radio transmission system of the type described with reference to Fig. 7. Six outgoing channel leads 1001, designated *a, b, c, d, e, f*, pass through a storage circuit 1002 similar to circuit 902 of Fig. 9. An oscillator 1005, producing a pilot wave of frequency $f_0$, also works into a frequency multiplier 1003 which generates the carrier frequency $f_c$ common to all six channels. The output of frequency multiplier 1003 passes directly through three modulators 1004A, 1004B, 1004C and also passes, after traversing a phase shifter 1006 which imparts a phase shift of preferably 90° to it, through three further modulators 1004D, 1004E and 1004F. The channel leads 1001 extend to respective ones of these modulators to amplitude-modulate these carriers in accordance with their respective stepped signal waves. The modulated carriers, on passing through a harmonics suppressor circuit here shown as six band-pass filters 1007A–1007F, assume a rounded envelope similar to the envelopes 702A–702D of Fig. 7. Next a respective pair of carriers, consisting of one carrier without phase shift and one which has passed through shifter 1006, is applied to each of three physically spaced radio transmitters 1008A, 1008B, 1008C; thus it will be seen that the outputs of filters 1007A and 1007D are supplied to transmitter 1008A, those of filters 1007B and 1007E to transmitter 1008B, and those of filters 1007C and 1007F to transmitter 1008C.

Three spaced radio receivers 1009A, 1009B and 1009C receive each a mixture of waves radiated by the transmitters 1008A, 1008B and 1008C. It will be noted that transmitter 1008A also sends out the pilot frequency $f_0$ from source 1005, this frequency being recovered at the receiving station by a narrow-band-pass filter 1010 connected to the output of receiver 1009A. The receivers 1009A–1009C also work, respectively, into three band-pass filters 1011A–1011C having the same pass band as filters 1007A–1007C, i. e., the band $f_c \pm F/12$. Two gate circuits 1015A and 1015D are controlled from the pilot wave passed by filter 1010 in such manner that pulses produced by a generator 1019 open the gate 1015A for an instant to sample the outputs of filters 1011A–1011C at a predetermined time shortly before the end of each cycle, as illustrated in Fig. 7(*f*) at 705, and that the same pulses after a delay in a circuit 1012 momentarily open the gate 1015D a short time later, as illustrated at 706. The resulting output pulses, lengthened by storage in circuit 1018, are applied to respective potentiometers 1014A–1014F each having six taps from which leads extend to the inputs of six amplifiers 1017A–1017F in a manner analogous to that shown for potentiometers 914A–914C and amplifiers 917A–917C in Fig. 9. At 1016 are shown the incoming channel leads extending from the amplifiers 1017A–1017F, respectively, and labeled *a, b, c, d, e, f* the same as corresponding outgoing leads 1001. It will be appreciated that a wave delay circuit such as 912, Fig. 9, may be employed in lieu of the pulse delay network 1012 and that the gating circuit 1015A, 1015D in such case, while following the wave delay circuit, may be inserted either ahead of the potentiometers as in Fig. 10 or back of them as in Fig. 9.

Figure 11:
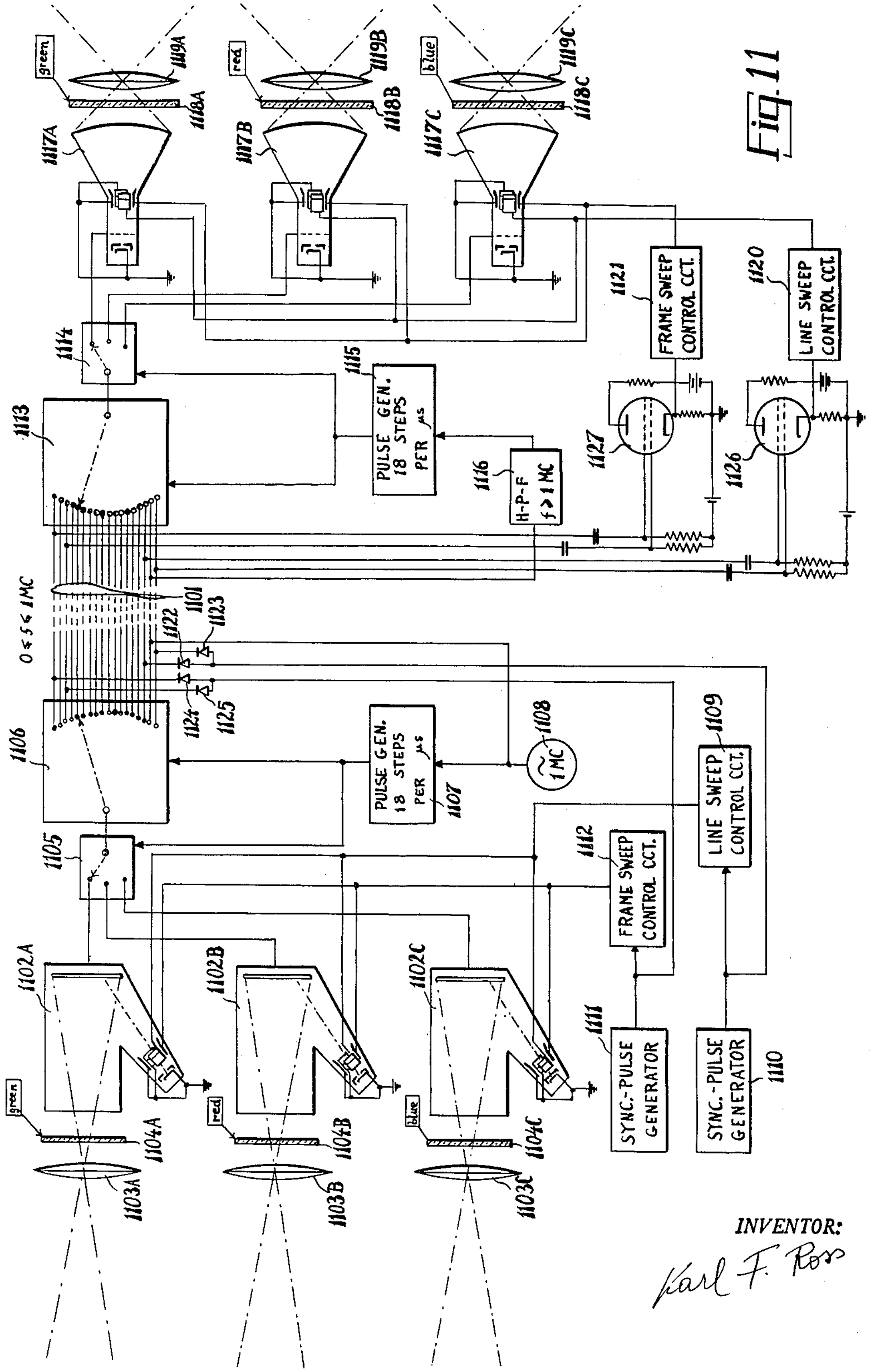
Fig. 11 is a circuit diagram showing a specific application of the principles of the invention to a television transmission system.

Fig. 11 shows a system according to the invention adapted for the transmission of color television images. It will be apparent that the system of Fig. 11 is fundamentally similar to the arrangement of Fig. 8, except that the storage and harmonics suppressor circuits such as 814, 815, 806 have not been illustrated again. This system uses eighteen channels 1101, adapted to transmit frequencies from zero cycles to one megacycle per second, it being assumed that it is required to transmit eighteen signal elements per microsecond. The signal source is shown as three television pick-up tubes 1102A, 1102B and 1102C onto the mosaic targets of which an image is projected by way of respective lenses 1103A 1103B, and 1103C and a green filter 1104A, a red filter 1104B and a blue filter 1104C, respectively. Output leads from the "green" tube 1102A, the "red" tube 1102B and the "blue" tube 1102C extend toward a three-position electronic stepping switch 1105 coupled, in turn, to an eighteen-position electronic stepping switch 1106, the latter serving to energize the channels 1101 in cyclic succession under the control of a pulse generator 1107. This generator, controlled from a one-megacycle oscillator 1108, steps both switches 1105 and 1106 at a rate of eighteen steps per miscrosecond, corresponding to one complete cycle for switch 1106 and six complete cycles for switch 1105 during each one-microsecond interval.

The horizontal sweep of each tube 1102A–1102C is controlled by a line sweep control circuit 1109 which applies the necessary sawtooth voltages to the horizontal deflecting electrodes of each tube, this circuit in turn being governed by a synchronizing-pulse generator 1110; in analogous manner a synchronizing-pulse generator 1111 controls a frame sweep control circuit 1112 applying swatooth voltages to the vertical deflecting electrodes of the tubes. The output of oscillator 1108 is shown applied to the #2 channel 1101 for transmission to the receiving station; since this is an unmodulated oscillation at or near the cutoff frequency of the channel, interference with the message signals transmitted over said channel will be at a minimum and may be readily compensated at the receiving end, if necessary. It will, of course, be apparent that a separate channel of narrow frequency range may be provided for the pilot wave produced by the oscillator 1108.

At the receiver a switch 1113 similar to switch 1106, followed by a switch 1114 similar to switch 1105, is connected to the incoming terminals of channels 1101. The switches 1113 and 1114 are stepped in substantial synchronism with the switches 1105 and 1106 by means of a pulse generator 1115 which is controlled by the pilot wave from oscillator 1108, this wave being isolated from the output of the #2 channel by means of a high-pass filter 1116 which substantially supresses all frequencies lower than one megacycle. Three reproducing cathode ray tubes 1117A, 1117B, 1117C are energized in cyclic succession by the switch 1114; their images are projected by means of a green filter 1118A a red filter 1118B and a blue filter 1118C, respectively, as well as respective lenses 1119A, 1119B, 1119C onto a suitable viewing screen or the like (not shown).

Horizontal sweep voltages and vertical sweep voltages for the tubes 1117A–1117C are derived from a line sweep control circuit 1120 and a frame sweep control circuit 1121, respectively, which operate in substantial synchronism (taking into account any phase delay to which the message signals may be subjected during transmission and decoding) with the corresponding sweep control circuits 1109 and 1112 at the transmitter. This synchronization is conveniently achieved by transmitting the synchronizing pulses from generators 1110 and 1111 to the receiver over certain of the channels 1101, e. g. in the form of signals exceeding the maximum amplitude of the message signals. As an insurance against false operation these synchronizing signals may be conveyed over a selected group of channels simultaneously; thus the output of generator 1110 is shown connected, by way of isolating rectifiers 1122 and 1123, to the #1 and #3 channels whereas the output of generator 1111 is shown similarly connected, by way of rectifiers 1124 and 1125, to the #16 and #18 channels. At the receiver the #1 and #3 channels are connected to respective input electrodes of a normally blocked amplifier tube 1126, controlling the line sweep control circuit 1120, and the #16 and #18 channels are connected to respective input electrodes of a similar amplifier tube 1127 which controls the frame sweep control circuit 1121.

Whereas the channels 1101 of Fig. 11 may be considered as consisting of individual coaxial or equivalent transmission lines having the relatively low cutoff frequency of 1,000,000 C. P. S., it will be understood that they may also comprise radio links, e. g. of the type shown in Figs. 9 or 10.

Fig. 12 shows various circuits for the conversion of discontinuous signal waves into sinusoidal oscillations adapted to be transmitted over channels of limited band width. A signal source 1201 feeds its output, e. g. a video signal, by way of a normally blocked amplifier 1202 to an electronic switch 1203 which cyclically distributes the incoming signals over a series of channels 1204, designated *a, b, c, d, e, f*. An oscillator 1205 of frequency F, which as before represents the number of signal elements to be transmitted per second, actuates an unblocking-pulse generator 1206, a stepping-pulse generator 1207 and an oscillation generator 1208 whose frequency is an exact submultiple of the frequency of oscillator 1205, being in this case equal to F/6. Pulse generator 1206 applies gating pulses, such as 100 in Fig. 1(*a*), to the amplifier 1202; the resulting signal pulses are fed to respective channels 1204 by the switch 1203 which is controlled by pulse generator 1207.

By way of illustration there are shown in Fig. 12 four different ways of transmitting the signals applied to certain of the channels 1204. Thus, the signals of channel *a*, consisting of spaced pulses as indicated at 1209, are applied in parallel to two gate circuits 1210, 1211 which are alternately unblocked, in step with respective ones of the signal pulses 1209, by gating pulses 1212, 1213 derived from a pulse generator 1214. Gating-pulse generator 1214 is controlled from the oscillation generator 1208, as is a discharge-pulse generator 1215 and a blocking-pulse generator 1216. Generator 1215 produces pulses 1217, 1218 similar to pulses 1212, 1213 but occurring slightly ahead of the latter; these pulses cause the discharge of two storage circuits 1219, 1220, respectively, which receive the outputs of gates 1210, 1211, respectively.

The output of storage circuit 1219 is applied in parallel to a gate circuit 1221, a gate circuit 1222 and a modulator 1225; the output of storage circuit 1220 is similarly applied, in parallel, to a gate circuit 1223, a gate circuit 1224 and a modulator 1226. Gates 1221, 1224 on the one hand and gates 1222, 1223 on the other hand are unblocked during alternate cycles of oscillation generator 1208 by means of respective pulses 1227, 1228 applied to these gates by pulse generator 1216.

It will be understood that the effect of gates 1210 and 1211 will be to select only the odd-numbered or the even-numbered signal pulses 1209, respectively, which are thereupon lengthened in the storage circuits 1219, 1220 in the manner illustrated in graphs *b* and *c* of Fig. 4. The resulting stepped waves are used, in the manner shown at 406 and 407 in graph *d* of Fig. 4, to modulate a sinusoidal wave which is derived from the output of oscillation generator 1208 and is applied by way of a phase shifter 1229 and a transformer 1230, with opposite phase, to the main inputs of modulators 1225 and 1226. The outputs of these modulators are combined with the aid of a resistor 1231 from whose center tap a lead extends to a grid of an amplifier tube 1232; this produces a wave corresponding to wave 408 of Fig. 4(*d*). It will be remembered from Fig. 4(*e*) that wave 408 was superimposed upon two relatively phase-displaced but otherwise identical waves 401, 401′; this is accomplished in Fig. 12 by applying the combined outputs of gates 1222, 1224 to a second grid and the combined outputs of gates 1221, 1223 to a third grid of tube 1232. Thus an oscillation of the character of wave 402, Fig. 4, will be available at the plate of tube 1232 which is then used to modulate, by means of a modulator 1233, the amplitude of a carrier $f_a$ obtained from a source 1234 and transmitted, after modulation, over a path 1235 designated "Channel A."

The signal pulses from channel *b* are applied to a register 1236 which is identical with the register 1210, 1211, 1219–1223 and which produces a stepped wave of the type shown at 501 in Fig. 5(*a*). The circuits of register 1236 are controlled by the pulses 1212, 1213, 1217, 1218, 1227, 1228 of generators 1214–1216 by way of delay circuits 1237, 1238 which serve to compensate for the phase displacement between the pulses on channel *b* and the pulses 1209 of channel *a*. The register output modulates a sine wave derived from oscillation generator 1208, which has been brought into the proper phase relationship by means of a phase shifter 1239, in a modulator 1240 to produce a wave similar to wave 506, 507 of Fig. 5(*b*); after this wave has passed through a low-pass filter 1241, it assumes the sinusoidal character of wave 502 and is thus ready for transmission over a path designated "Channel B" by means of a radio transmitter 1242.

The signal pulses from channel *e* are lengthened by means of a storage circuit 1243 which is periodically discharged by the pulses 1212 and 1213 from generator 1214. For reasons set out in connection with Fig. 3 it is desirable that these discharge pulses be timed in such manner that the pulse vanishes after an interval of T/2, to produce a stepped wave of the character indicated by the hatched areas in Fig. 3. This timing of the discharge pulses is accomplished by a further delay circuit 1244 through which the pulses 1212, 1213 pass after traversing the delay circuits 1237, 1238, respectively. The stepped wave produced in the storage circuit 1243 is rounded off by means of a low-pass filter 1245 and is then transmitted over a path 1246 designated "Channel E."

The signal pulses from channel *f* are lengthened by a storage circuit 1247 to which they are applied after passing through a delay network 1248, the latter enabling the same signal pulses to be applied to an auxiliary electrode of the storage circuit so as to discharge same just before arrival of the next pulse to be stored; the arrangement is similar to that shown in Fig. 7 of my aforementioned co-pending application Ser. No. 275,953. The signal pulses are thus converted into a stepped wave similar to waves 103A–103F of Fig. 1 (except for the fact that the wave amplitude drops to zero just before each new step) which amplitude-modulates the output $f_f$ of a carrier oscillator 1249 in a modulator 1250. A band-pass filter 1251 converts the stepped envelope of the modulated carrier into a sinusoidal one, e. g. as shown at 104A–104F, whereupon the carrier is transmitted over a path designated "Channel F" by means of a transmitter 1252.

A special transmitter for sending out the pilot wave from generator 1205 is shown at 1252.

It will be understood that the signal source 1201 may comprise a plurality of individual sources, comparable to the pick-up tubes 1102A–1102C of Fig. 11, in combination with a feeder switch such as 1105, but that, on the other hand, the pulse trains passing over some or all of the channels 1204 may be components of the same signal. In the latter case it will, of course, be desirable to use identical transmission paths for the several signal components, in lieu of the different types of transmission circuits shown here by way of illustration. The stepping switch 1203, and similar switches shown elsewhere in the drawing, may comprise thyratron rings, cathode ray tubes having their beams deflected over successive targets by a progressively charged condenser, and other, equivalent circuit arrangements known per se.

Fig. 13 shows, very diagrammatically, a communication system using still another method of preventing interference between different messages or message components transmitted simultaneously over respective radio channels occupying substantially the same frequency band. The system comprises an array of six transmitters 1301, 1302, 1303, 1304, 1305, 1306 and three receivers 1307, 1308, 1309. Transmitters 1301 and 1302 form a pair and are energized in phase opposition by a signal designated $A^+$ and $A^-$; transmitters 1303 and 1304 are similarly energized in phase opposition by a signal designated $B^+$ and $B^-$, as are transmitters 1305 and 1306 where the signal has been designated $C^+$ and $C^-$.

A plane of symmetry bisecting the distance between each pair of transmitters, indicated by lines 1310A, 1310B and 1310C, respectively, defines a neutral zone in which the signal from a respective pair of transmitters cannot be received. Thus, receiver 1307 positioned at the intersection of lines 1310B and 1310C will only receive the signal A, receiver 1308 positioned at the intersection of lines 1310A and 1310C will only receive the signal B, and receiver 1309 positioned at the intersection of lines 1310A and 1310B will only receive the signal C. It is equally possible to use stations 1307–1309 as transmitters and stations 1301–1306 as receivers arranged in pairs whose outputs are differentially combined, or to provide a mixed system in which, say, one channel comprises a single receiver and two transmitters whereas for the remaining channels the arrangement is reversed.

The arrangement of Fig. 13 is limited, by geometrical considerations, to a maximum of three channels each of which, however, may be used for the transmission of a plurality of message components, e. g. in the manner described in connection with Figs. 6 and 9 or by the use of two relatively dephased carriers as disclosed in my copending application Ser. No. 757,611 (now Patent No. 2,619,547) and discussed with reference to Figs. 7 and 10 of the present application. It may also be mentioned that for a given pair of transmitters or receivers, such as 1301, 1302, there exist in addition to the zone 1310A an infinite number of additional neutral zones, of hyperboloid configuration, in which the signal likewise vanishes; one pair of such zones has been indicatted at 1311A. These additional zones, however, will have a location depending upon frequency, so that (unlike the zones 1310A–1310C) they will be of use only where the carrier amplitude remains constant over a number of cycles, e. g. as shown in Fig. 6, the number of available zones depending upon the number of such successive cycles of constant amplitude. In such case it would be possible to locate additional receivers (or transmitters) at points where those additional zones, such as 1311A, intersect with one another or with some median zone such as 1310B. Finally it should be noted that, especially with the use of these additional zones, it is possible to increase the number of channels by combining the arrangements of Figs. 10 and 13, as by duplicating, say, the transmitters such as 1008A–1008C and so positioning the transmitter pairs as to produce a number of points near the receiving array at which the neutral zones from two or more of these transmitter pairs intersect, the individual receivers such as 1009A–1009C being then located at these points; it will then be possible to use four or more individual receivers with a like number of transmitter pairs, or four or more individual transmitters with a like number of receiver pairs), some of the receivers receiving the signal from a single pair of transmitters only whereas other receivers will receive a mixture of signals to be separated from one another by a system of potentiometers or the like as illustrated in Figs. 9 and 10. It will be understood that with the last-mentioned arrangement the separation of mixed signals will be greatly simplified, in view of the fact that one or more of the components of the mixture received at one receiver may be received in pure form at a different receiver.

Although the conversion of signal pulses into message waves of limited band width and the subsequent reconstruction of the pulses from such wave, as well as the mixing and subsequent separation of different messages or message components, has been disclosed herein with particular reference to a system for the transmission and reception of intelligence, it is to be understood that these methods are also applicable to different arrangements, e. g. to systems for the coding or the recording of messages in graphic form, on film, on a magnetic tape and so forth. Thus, the invention is not limited to the specific embodiments described and illustrated but is capable of numerous modifications and adaptations without, for this reason, departing from the scope of the appended claims.

I claim:

1. The method of converting periodically recurring signal pulses of varying amplitudes, having a width substantially less than their spacing, into sinusoidal waves which comprises the steps of lengthening each pulse to form a rectangular wave step having a width substantially equal to at least a major fraction of the reciprocal of the pulse cadence, thereby producing a stepped wave having a fundamental frequency of the order of said pulse cadence, harmonics of said fundamental frequency, and side-band frequencies up to twice the fundamental frequency, producing a sine wave of said fundamental frequency, amplitude-modulating said sine wave with said stepped wave, and substantially suppressing all of said harmonics above the highest of said side-band frequencies by smoothing out discontinuities of the modulated sine wave.

2. The method according to claim 1 wherein said sine wave is in phase with the fundamental frequencies of the modulating stepped wave.

3. The method according to claim 1 which comprises the further steps of producing a second sine wave in phase opposition to the first-mentioned sine wave, splitting said stepped wave into two stepped modulating waves consisting of the odd-numbered and the even-numbered ones of said wave steps, respectively, lengthening said wave steps of each of said modulating waves to substantially the beginning of the next step of the respective modulating wave, thereby causing said modulating waves to overlap by half a step length, placing said sine waves in phase quadrature with said fundamental frequency, thereby causing the peaks of said sine waves to coincide with the discontinuities of said stepped modulating waves, amplitude-modulating said sine waves with said stepped modulating waves, respectively, and producing a resulting oscillation by combining the sine waves so modulated, said harmonics being suppressed by substantially eliminating all discontinuities of said resulting oscillation.

4. The method according to claim 5 wherein the discontinuities of said resulting oscillation are suppressed by superimposing said oscillation upon two substantially identical stepped waves staggered with respect to each other by one wave step, the leading one of said staggered waves being in step with the original stepped wave, composed of said rectangular wave steps, and having amplitudes proportional to those of said original wave and equal to respective peak amplitudes of said modulated sine waves.

5. The method of converting a message signal occupying a given frequency range into a plurality of message components each having a band width substantially less than said range which comprises the steps of periodically sampling said message signal at a rate of the order of at least the highest signal frequency to be preserved, thereby producing a train of uniformly spaced pulses of varying amplitudes, cyclically grouping said pulses into a plurality of sub-trains, lengthening each pulse of each sub-train to form a rectangular wave step having a width substantially equal to at least a major fraction of the reciprocal of the pulse cadence of the sub-train, thereby producing a series of stepped waves each having a fundamental frequency of the order of said pulse cadence, harmonics of said fundamental frequency, and side-band frequencies up to twice the fundamental frequency, producing a plurality of sine waves of said fundamental frequency, amplitude-modulating said sine waves with respective ones of said stepped waves, and substantially suppressing all of said harmonics above the highest of said side-band frequencies by smoothing out discontinuities of the modulated sine wave.

6. The method of mixing and subsequently separating a plurality of signals which comprises the steps of amplitude-modulating different carriers with respective ones of said signals in a manner causing all of said carriers to attain amplitudes characteristic of the respective signals within a given period, combining at least portions of all of said carriers during said period with different phase relationships to form a number of wave mixtures equal to the number of carriers, selecting said phase relationships to be expressable by non-homogeneous determinants from which each signal amplitude may be mathematically determined in terms of instantaneous values of said wave mixtures multiplied by fixed proportionality factors, sampling said wave mixtures at predetermined times to determine said instantaneous values, multiplying said instantaneous values by said mathematically determined proportionality factors, and forming combinations of the so multiplied instantaneous values to represent said signal amplitudes.

7. The method according to claim 6 wherein said carriers are given different frequencies and are combined into a composite wave successive portions of which represent the said wave mixtures.

8. The method according to claim 6 wherein said carriers are given identical frequencies and are combined into a plurality of composite waves each with a different phase relationship of the component carriers.

9. The method according to claim 8 wherein at least one of said carriers is the sum of two sub-carriers of identical frequency but different phase, each of said sub-carriers being amplitude-modulated by a different signal.

10. In a communication system, in combination, a transmitting station and a receiving station, a source of signals at said transmitting station, a plurality of channels extending between said transmitting station and said receiving station, said source of signals having an output occupying a frequency range greater than the frequency band transmittable over any of said channels, gating means connected to said source and periodically sampling said output at a rate of the order of at least the highest signal frequency to be transmitted, thereby producing a train of uniformly spaced pulses of varying amplitudes, distributor means connected to said gating means and cyclically distributing said pulses over said channels, thereby producing a sub-train of pulses on each of said channels, pulse storage means in each of said channels lengthening the pulses of the respective sub-train into wave steps each having a width equal, substantially, to at least a major fraction of the reciprocal of the pulse cadence of the sub-train, thereby producing in each channel a stepped wave having a fundamental frequency of the order of said pulse cadence, harmonics suppressor means in each of said channels eliminating substantially all frequencies in said stepped wave greater than the second harmonic of said fundamental frequency, blocking means connected to each channel at said receiving station, timing means so controlling said blocking means as to enable passage of a wave incoming over any channel only at a predetermined point of a cycle at which the amplitude of such wave substantially bears a predetermined relationship with the amplitude of a respective pulse of the corresponding sub-train, integrating means cyclically combining the wave portions thus passed at each channel into a single wave, and reproducer means converting said single wave into a continuous signal substantially duplicating the output of said source of signals.

11. The combination according to claim 10, including a source of pilot wave, transmission means making said pilot wave available at both said transmitting station and said receiving station, said timing means being responsive to said pilot wave, and control means at said transmitting station responsive to said pilot wave and substantially synchronizing the operation of said distributing means with that of said blocking means.

12. The combination according to claim 10 wherein said channels include three radio links each comprising transmitting apparatus at said transmitting station and receiving apparatus at said receiving station, said apparatus of each channel consisting of a single wave translating unit at one of said stations and of a pair of spaced wave translating units at the other of said stations, said pairs of units of said three channels defining each a neutral zone, each of said single units being positioned at a point of intersection of the neutral zones of two of said channels.

13. The combination according to claim 10 wherein said channels include a plurality of sources of carrier waves, modulating means amplitude-modulating the carrier waves from said sources with respective ones of said stepped waves, said carrier wave having different frequencies, transmitter means sending out the so modulated carrier waves, carrier suppressor means periodically inactivating said sources of carrier waves and thereafter restarting same with a predetermined phase relationship, receiver means receiving a mixture of said modulated carrier waves, wave sampling means measuring the instantaneous amplitudes of said mixture at a number of successive instants within a period during which the peak amplitudes of all of said carrier waves are substantially constant, the number of said instants equaling the number of said carrier waves, delay means temporarily preserving said amplitudes during the measuring thereof, circuit means so combining predetermined fractions of said stored amplitudes as substantially to reproduce the individual amplitude of each of said carrier waves, and synchronizing means keeping said wave sampling means in step with said carrier suppressor means.

14. The combination according to claim 13 wherein the frequencies of at least some of said carrier waves are within the side bands of other of said carriers.

15. The combination according to claim 10 wherein said channels include a plurality of sources of carrier waves, modulating means amplitude-modulating the carrier waves from said sources with respective ones of said stepped waves, all of said carrier waves having the same frequency, a plurality of spaced radio transmitters, one for each channel, sending out respective ones of said modulated carrier waves, a plurality of spaced radio receivers, one for each channel, receiving each a different mixture of the carrier waves sent out by said transmitters, a plurality of wave sampling means respectively connected to each of said receivers and individually measuring the instantaneous amplitudes of all of said mixtures at predetermined instants, circuit means so combining predetermined fractions of the outputs of said wave sampling means as substantially to reproduce the individual amplitude of each of said carrier waves, and synchronizing means keeping all of said wave sampling means in step with one another and with said sources of carrier waves.

16. The combination according to claim 15 wherein at least one of said sources of carrier waves includes two wave generators of like frequency but different phase, the outputs of said generators being individually modulated with different stepped waves by said modulating means and being applied by said modulating means to a single one of said radio transmitters, at least one of said wave sampling means being controlled by said synchronizing means to measure the amplitudes of one wave mixture at two successive instants, said circuit means further including delay means temporarily preserving the amplitudes of at least one wave mixture during the measuring thereof.

17. In a communication system, in combination, a source of stepped signal wave having steps each of a length expressable as an integral number times a fixed unit length, a generator of sine wave having a frequency equal to the reciprocal of double said unit length, modulator means connected to said source and to said generator, said modulator means amplitude-modulating successive cycles of said sine wave with respective steps of said signal wave, thereby producing an oscillation having sinusoidal portions separated by discontinuities, and smoothing means connected to the output of said modulator means and substantially suppressing said discontinuities, thereby converting said oscillation into a substantially sinusoidal one.

18. The combination according to claim 17, including a source of carrier frequency and means for modulating said carrier frequency with said substantially sinusoidal wave.

19. In a communication system, in combination, a source of stepped signal wave having steps each of a length expressable as an integral number times a fixed unit length, gating means for dividing said stepped wave into successive steps of unit length and splitting said wave into two stepped modulating waves consisting of the odd-numbered and the even-numbered ones of said unit-length steps, respectively, said modulating waves having each a fundamental frequency equal to the reciprocal of double said unit length, generator means for producing two sine waves of opposite phase and equal amplitudes having a frequency equal to said fundamental frequency and in quadrature therewith, storage means for lengthening said unit-length steps of said modulating waves to substantially double said unit length, modulator means for modulating said sine waves with the so modified stepped modulating waves, respectively, circuit means for combining the so modulated sine waves, thereby producing a resulting oscillation, and harmonics suppressor means for eliminating all discontinuities of said resulting oscillation.

20. The combination according to claim 19 wherein said harmonics suppressor means comprises means for producing a first stepped wave in phase with said signal wave, said first stepped wave having amplitudes proportional to those of signal wave and equal to respective peak amplitudes of said modulated sine waves, means for producing a second stepped wave identical with said first stepped wave but lagging same by one unit length, and means for superimposing said resulting oscillation upon said first and second stepped waves.

21. The combination according to claim 19, including a source of carrier frequency and means for modulating said carrier frequency with said resulting oscillation.

References Cited in the file of this patent

UNITED STATES PATENTS

| | | |
|---|---|---|
| 1,911,850 | Sandeman et al. | May 30, 1933 |
| 2,402,059 | Craib | June 11, 1946 |
| 2,405,252 | Goldsmith | Aug. 6, 1946 |
| 2,482,039 | Thompson | Sept. 13, 1949 |
| 2,532,338 | Schlesinger | Dec. 5, 1950 |
| 2,586,916 | Chamagne et al. | Feb. 26, 1952 |
| 2,605,361 | Cutler | July 29, 1952 |
| 2,632,147 | Mohr | Mar. 17, 1953 |